(No Model.) 2 Sheets—Sheet 1.
P. R. ALLEN.
COUPLING FOR ELECTRICAL CONDUCTORS.
No. 273,429. Patented Mar. 6, 1883.
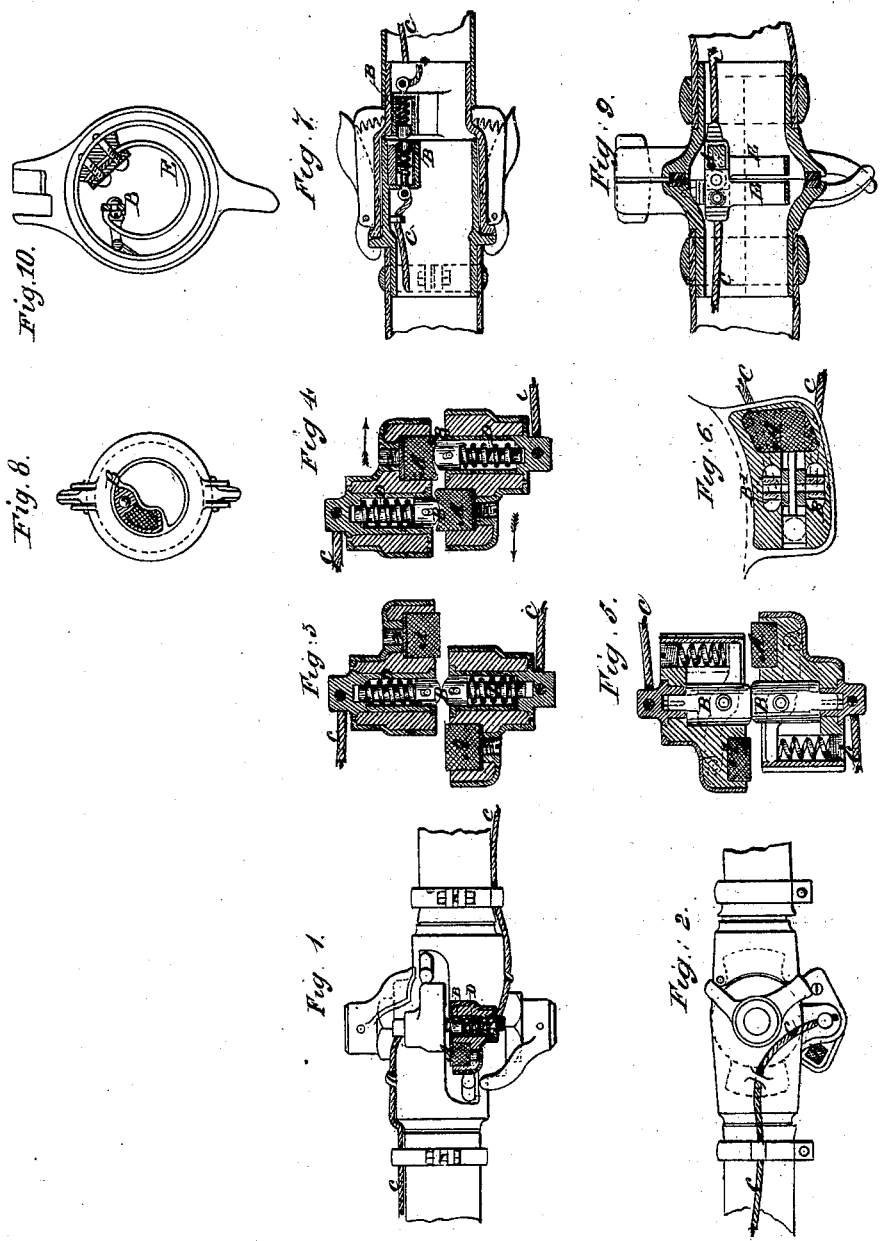
Witnesses:
Philip Mauro
C. J. Hedrick
Percy R Allen
by A. Pollok
his attorney (No Model.) 2 Sheets—Sheet 2.
P. R. ALLEN.
COUPLING FOR ELECTRICAL CONDUCTORS.
No. 273,429. Patented Mar. 6, 1883.
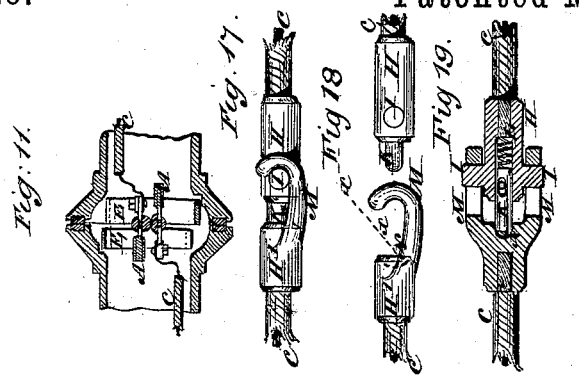
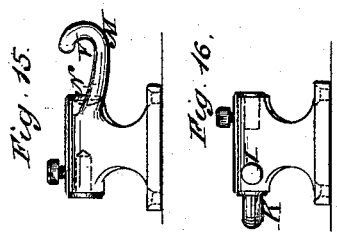
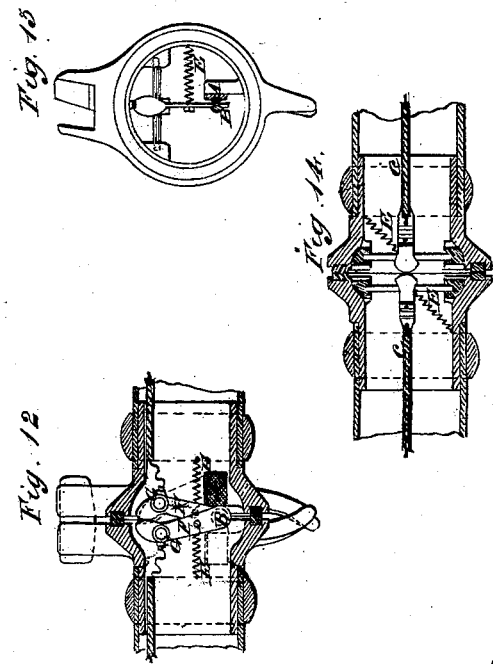
Witnesses:
Philip Mauro
C. J. Hedrick
Percy R. Allen
by A Pollok
his attorney.

UNITED STATES PATENT OFFICE.

PERCY RUSKIN ALLEN, OF SOUTHWARK, COUNTY OF SURREY, ENGLAND.

COUPLING FOR ELECTRICAL CONDUCTORS.

SPECIFICATION forming part of Letters Patent No. 273,429, dated March 6, 1883.

Application filed January 10, 1883. (No model.) Patented in England May 20, 1881, No. 2,215.

*To all whom it may concern:*

Be it known that I, PERCY RUSKIN ALLEN, a subject of the Queen of Great Britain, and residing at Southwark, in the county of Surrey, England, have invented certain Improvements in Couplings for Electrical Conductors, (for which I have obtained a patent in Great Britain, No. 2,215, dated May 20, 1881,) of which the following is a specification.
This invention has for its object improvements in couplings for electrical conductors. To connect or couple the wires or cables used as conductors of electricity for intercommunication or electrical illumination or other purposes in railway-trains, I adapt existing air, vacuum, hydraulic, or other brake couplings on railway-trains to serve as or to carry the contact-points or terminals of the electrical conductor attached to each carriage, the contact being made by the bodies of the couplings themselves, or by plungers, fingers, springs, or other devices, either in electrical connection with or insulated from the coupling. In order that the contacts may be kept constantly clean and free from dirt, I provide, in connection with the contact-pieces, cleaning or scouring devices so arranged as to be brought into operation by the act of coupling. Various substances may be used in carrying out this part of my invention—such, for example, as emery, composition, or bath-brick, or other grinding, cutting, or cleaning material or surface.

In one form of my apparatus, as combined with a Westinghouse air-brake coupling, I attach to or form on one or both halves of the coupling a box or case in which is a cylinder containing a contact-plunger, which has a slight endwise motion and is pressed outward by a spring. Near and parallel to the above-mentioned cylinder is a cylinder which presents a grinding, cutting, or cleaning surface such as above referred to, over which the opposite contact-plunger grinds or scrapes every time the coupling is connected or disconnected, whereby the ends or faces of the contact-pieces are kept continually clean, so as to offer no surface of electrical resistance. The conductors or cables may be laid or carried along the hose-pipes, and are in electrical connection with the plungers in the boxes or cases.

When my invention is used in connection with a Clayton coupling the details of its arrangement must be slightly modified, so that the grinding, scraping, or cutting action may take place during the oscillatory or vibratory action that ensues during the operation of connecting and disconnecting the coupling.

It will be evident that my invention may be variously modified according to the forms of the couplings—such as those used in the Smith, Eames, and other brakes—and the circumstances under which it is to be employed. When the current traverses the body of the coupling and the contact is made between the two parts thereof, I provide for the cleaning of the surfaces by cylinders, disks, or pieces of grinding or cleaning material attached to or let into the body of the coupling in any suitable and convenient positions. In cases where a return-wire is employed and there is only one hose-pipe at each end of the carriage, I duplicate my arrangement and employ two sets of contact apparatus on each coupling. I also, when required, arrange the hooks upon which the couplings are suspended at the end of the train, or at the end of the carriage when it is detached from the train, so that the two conductors, when two are employed, are short-circuited, or the single conductor, when one only is used, is connected to the earth-wire. According to another arrangement I connect electrical conductors by a hook-coupling. This coupling has male and female parts. The male part consists of a tube containing a plunger forced outward by a spring, and has two trunnions which lie in two hooks in the female part, and are forced into intimate contact with the hooks by the pressure of the spring against the plunger, which abuts into a slight socket or footstep between the hooks on the female part. This coupling is applicable for connecting various forms of electrical conductors, either on railway-trains or elsewhere.

In the drawings, Figures 1 and 2 are elevation and plan, respectively, of an electrical connection with the Westinghouse brake-coupling, and Figs. 3 and 4 are detail views, to a larger scale, of the same. In this arrangement the electrical contact is made by a pair of plungers, B B, which are in electrical connection with the conductors C C, extending along the train, and when the brake-couplings are locked in place the said plungers are pressed hard together by means of spiral springs D. With each half of the brake-coupling there is one of these plungers, and also a piece of cleaning or scouring material, A. In the act of locking the brake-coupling together each half turns a portion of a revolution on the other, as is well understood, and the plungers B B, before coming into contact, are thus caused to pass over the cleaning or scouring material A A, and thus the dirt, tarnish, oxide, or other impurity is removed and a good electrical connection insured. The cleaning or scouring material may be of any desired nature, such as a mixture of emery and india-rubber, pumice-stone, emery, glass, or sand-paper; or it may be a roughened metallic file-like surface. Where necessary, a fibrous substance or form of brush may also be used in connection with the cleaning material, so that after the plunger has passed over the cleaning material it will come in contact with the fiber or brush and have any loose particles of dirt or metallic dust removed therefrom; but with ordinary currents of electricity the passage over the cleaning material will be enough. The contact-pieces and cleaning-surfaces may be disposed in various ways, either in the interior or on the exterior of the brake-coupling. The brake-couplings may be fitted with one or more electrical connections of this kind, so that contact between portions of either one or more electrical conductions on a train may be made in this manner.

In Figs. 1, 2, 3, and 4 the coupling is shown arranged for one conductor only; but in Figs. 5 and 6 an arrangement for two contacts, B and B', is shown. In this case the contact-pieces in each half of the coupling are placed side by side, but insulated from one another, and are pressed outward by a spring or springs, and before coming into contact pass over the cleaning or scouring material or surface in the same manner as in Figs. 1, 2, 3, and 4. In the arrangement, Figs. 7 and 8, the coupling is of the form used with Smith's vacuum-brake. In this arrangement, as in the Westinghouse, each half of the brake-coupling is turned a portion of a revolution on the other in the act of locking; but in some arrangements of brake-couplings the parts do not turn on one another, but come together face to face. The Clayton vacuum-brake coupling used in the arrangement shown in Figs. 9, 10, and 11, and again in Figs. 12, 13, and 14, is an example of such. In Figs. 9, 10, and 11 the contact-pieces are shown at the ends of curved springs E E, which are fixed to but insulated from the couplings, and which are in connection with the conductors C C, extending along the carriages. The outer extremities of these springs are also provided with pieces of cleaning material A A, and in the act of putting the coupling together the contact-pieces B B are caused to pass over the cleaning or scouring material or surface before meeting, the spring having sufficient elasticity to insure a good contact. Another arrangement with, as already stated, the same form of coupling is shown in Figs. 12, 13, and 14. In this case the contact-pieces B B are placed at the ends of small levers F F, which turn on studs or pins G G in the interior of the coupling. The shorter ends of these levers are enlarged and rounded, and from spiral springs E E, attached to the longer ends, derive a tendency to outward movement. These springs are placed diagonally, so that, besides pulling the longer arms of the levers backward, they also tend to draw them sidewise, so that the contact-pieces B B press against the cleaning or scouring material or surface and form a good contact when opposite one another. When the couplings are apart the pull of the spring causes the rounded ends of the levers to project somewhat forward; but when the couplings are put together the rounded ends come in contact, which causes the longer arms of the levers to move across the cleaning or scouring material or surface A A into contact with one another. Other arrangements may be employed, so long as there be used a separate contact-piece, in connection with brake-couplings of railway-trains for forming electrical connections between different portions of the train, these contact-pieces being arranged in connection with cleaning or scouring material or surfaces, so that in the act of making the brake-connection the contact-pieces are first cleaned, and then brought into and coupled in electrical connection. This electrical connection may be used in electrical conductors for electric lighting, electrical intercommunication in trains for electrically actuating air, vacuum, hydraulic, or other brakes, and for other purposes where it may be desired to form an electrical connection between different portions of the train.

Figs. 15, 16, 17, 18, and 19 show an arrangement of automatic coupling for joining cables and conductors together and to terminals. The coupling is made in two portions. The male part consists of a cylinder, H, which has two studs or trunnions, I I, formed on it near the end. A plunger, K, with a rounded end slides in the interior of this cylinder, and is pressed outward by a spiral spring, L, acting on its base. The conductor or cable C is soldered or otherwise attached to the other end of the cylinder. The other conductor to be joined is soldered into a similar cylinder, H', which, instead of trunnions, has two hooks, M M, that project and embrace the trunnions I I of the male portion when the couplings are placed together. The end of the female portion is slightly hollowed at N to receive the end of the plunger K. Figs. 17, 18, and 19 show this form of coupling applied for joining cables, and Figs. 15 and 16 show it arranged as a terminal in a lamp or machine; but the action is substantially the same. To form the connection the male portion of the coupling is pressed at an angle against the female portion of the position shown in the dotted line $xx$ in Fig. 18, so that the plunger presses against the recess at the end of the female portion and compresses the spring sufficiently to permit the trunnions to pass under the ends of the hooks. If the couplings are then released, the spring expands and forces the trunnions against the hooks. To disconnect the two parts of the coupling the action is reversed.

I claim—

1. In a coupling device, the combination, with means for holding the two parts together, of a spring-actuated plunger or plungers for making electrical connection between the parts as the act of coupling is performed, substantially as described.

2. In an air-brake or similar coupling, and in combination with devices for holding the two parts together, the spring-actuated plungers or equivalent devices, as specified, one in each part, adapted to make electrical contact with each other as the coupling is performed, substantially as described.

3. In an electric coupling, the combination, with the contact-surfaces, of the cleaning or scouring surfaces, substantially as described.

4. The combination, in an electric coupling, with the contact-pieces, of cleaning or scouring surfaces arranged to operate upon said contact-pieces in the act of connecting and disconnecting the parts of the coupling, substantially as described.

5. The combination, with the spring-actuated devices for making electrical contact, of the cleaning or scouring surfaces adapted to operate upon the said contact devices in the act of separating or bringing them together, substantially as described.

6. In an air-brake or similar coupling, the combination of plungers or similar devices having smooth faces, springs for pressing said faces together when the coupling is made, and blocks or pieces of cleaning, scouring, or polishing material, arranged to brush over the surfaces of said contact-pieces in the act of coupling or uncoupling, substantially as described.

In testimony whereof I have signed my name to this specification in the presence of two subscribing witnesses.

PERCY RUSKIN ALLEN.

Witnesses:
WM. JOHN WEEKS,
CHARLES DODGE,
  Both of 31 Lombard Street, London.